(12) United States Patent
Dorenbosch et al.

(10) Patent No.: US 6,469,997 B1
(45) Date of Patent: Oct. 22, 2002

(54) METHOD FOR TRANSMITTING COLLISION-FREE MESSAGES IN A DIGITAL SELECTIVE CALL SIGNALING PROTOCOL

(75) Inventors: Jheroen Pieter Dorenbosch, Paradise, TX (US); Eduardo Guntin, Parkland, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/301,679

(22) Filed: May 3, 1999

(51) Int. Cl.[7] .............................................. H04B 7/212
(52) U.S. Cl. ...................... 370/337; 370/348; 370/445; 370/458
(58) Field of Search ................................ 370/445, 442, 370/347, 447, 461, 462, 458, 241, 318, 517, 519, 230, 235, 234, 328, 329, 330, 336, 340, 341, 345, 346, 348

(56) References Cited

U.S. PATENT DOCUMENTS

| 5,721,733 | A |   | 2/1998 | Wang et al. ................. 370/332 |
| 5,953,344 | A | * | 9/1999 | Dail et al. .................... 370/443 |
| 6,292,493 | B1 | * | 9/2001 | Campbell et al. ............ 370/445 |
| 6,370,153 | B1 | * | 4/2002 | Eng ............................ 370/438 |

* cited by examiner

Primary Examiner—Ricky Ngo
Assistant Examiner—Tri H. Phan
(74) Attorney, Agent, or Firm—Pablo Meles; Matthew C. Loppnow

(57) ABSTRACT

A plurality of transceivers (114) each include a transceiver circuit (409), and a processing system (412) coupled to the transceiver circuit. A periodic communication cycle is divided into a plurality of frames, each frame having a predetermined interval. Each of the plurality of frames in turn is subdivided into first and second portions (301, 303), whereby the second portion is used by the transceivers for requesting access to a communication medium (113). The second portion is further subdivided into a plurality of time slots, each time slot having a duration equal to or greater than a predetermined propagation delay of a signal transmitted between transceivers. Each of the transceivers is assigned to a corresponding one or more of the time slots. When transmitting a message from a selected one of the transceivers to a recipient communication device (115), the processing system of the transceiver selected is adapted to enable the transceiver circuit to monitor transmission energy in the communication medium during a time slot immediately preceding the time slot assigned to the transceiver selected (208, 210, 212), and if the energy measured is below a predetermined threshold, cause the transceiver circuit to transmit at least a portion of the message to the recipient communication device beginning at the time slot assigned to the transceiver selected (214, 216, 218, 220).

27 Claims, 7 Drawing Sheets

206,250

METHOD FOR TRANSMITTING COLLISION-FREE MESSAGES IN A DIGITAL SELECTIVE CALL SIGNALING PROTOCOL

FIELD OF THE INVENTION

This invention relates in general to communication systems, and particularly, to a method for transmitting collision-free messages in a digital selective call signaling protocol.

RELATED INVENTION (S)

The present invention is related to the following invention which is assigned to the same assignee as the present invention:

Ser. No. 09/301,679 mailed Mar. 31, 1999, by Xie et al., entitled "Method for Transmitting Collision-Free Messages in a Communication System and Apparatus Therefor."

BACKGROUND OF THE INVENTION

Presently, there are many medium access protocols in existence for exchanging messages between decentralized communication devices utilizing a common channel. Ethernet is an example of a commonly used communication protocol in decentralized local area networks. Aloha is another.

Ethernet networks employ a channel acquisition technique generally known as CSMA/CD, which stands for Carrier Sense Multiple Access Collision Detection. Essentially, this technique requires a communication device (e.g., a personal computer) to sense a carrier signal of another communication device actively using the communication medium prior to acquiring the channel. If activity is detected, the communication device postpones acquisition of the channel according to a random delay. If no activity is detected, the communication device begins transmitting a message immediately. If upon transmitting the message a collision is detected, the communication device terminates transmission, and postpones acquisition of the channel according to a random delay.

In Aloha networks, on the other hand, a communication device acquires a channel and begins transmission of a message without sensing for other users. A collision is detected upon the communication device failing to receive an acknowledgment signal from the recipient communication device within a specified time. Upon detecting a collision, the communication device postpones reacquisition of the channel according to a random delay. It should be apparent that the potential for collisions in the decentralized communication systems described above makes their use inefficient under high traffic loads. This is especially a problem in systems where a short latency is desirable. Centralized communication systems also may insert unnecessary latency into a lightly loaded system. Accordingly, a method and apparatus is needed for minimizing message collisions without degrading channel utilization efficiency.

DESCRIPTION OF THE PREFERRED EMBODIMENTS (S)

Figure 1:
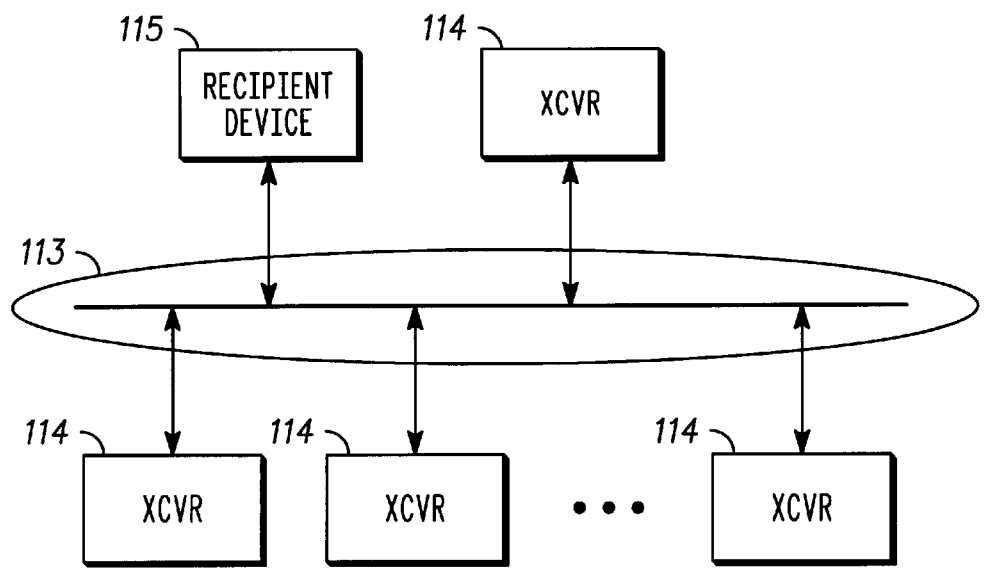
FIGS. 1–2 show alternative embodiments of a communication system, each depicted by an electrical block diagram, according to the present invention.
Figure 2:
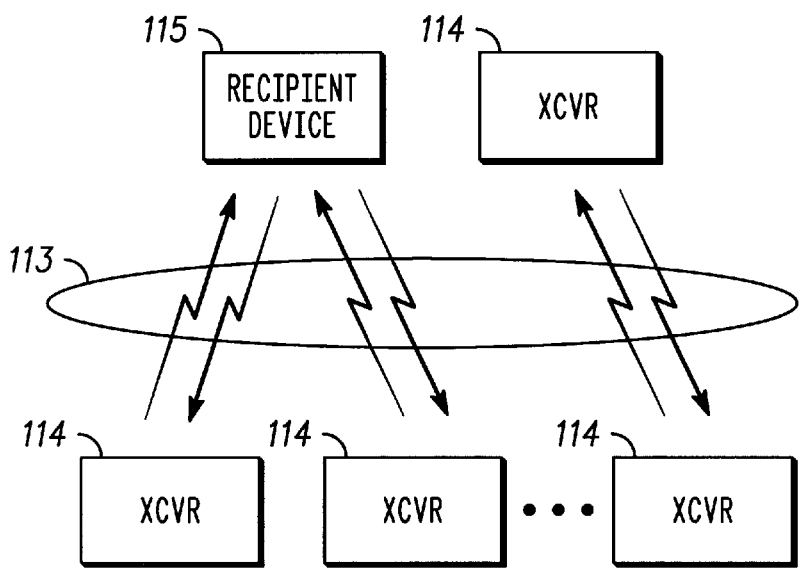

FIGS. 1–2 show alternative embodiments of a communication system, each depicted by an electrical block diagram, according to the present invention. A first embodiment of the communication system shows a plurality of wireline transceivers 114 interconnected by way of a wireline communication medium 113. The second embodiment shown in FIG. 2 is analogous to the system illustrated in FIG. 1 with the exception that the transceivers 114 and the communication medium 113 are wireless. In both of these embodiments, a transceiver 114 is selected for communicating with a recipient communication device 115, which is capable of one-way or twoway communication.

The recipient communication device 115 may comprise any one of several embodiments. In one instance, for example, the recipient communication device 115 may comprise a targeted one of the transceivers 114. In another instance, the recipient communication device 115 may comprise a conventional portable and battery-operated SCR (Selective Call Radio) for wireless applications. Each of these embodiments will be discussed below.

FIGS. 3–6 are flowcharts depicting how each of the embodiments of FIGS. 1–2 operate according to the present invention. The steps shown in the flowcharts of FIGS. 3–6 are preferably programmable instructions operating from each of the transceivers 114. The hardware implementation of the transceiver 114 will be discussed later. As depicted, the flowchart of FIG. 3 begins with step 201. In this step a periodic communication cycle is divided into a plurality of frames (see FIGS. 7–8). Message exchanges between the transceivers 114 preferably conform to the FLEX™ or ReFLEX™ (FLEX™ or ReFLEX™ is a trademark of Motorola, Inc.) digital selective call signaling protocol as modified by the present invention. The FLEX™ and ReFLEX™ protocols are presently in use by various system operators in the United States. It will be appreciated, however, that other communication protocols that are suitable to this invention can be used.

Each of the plurality of frames are preferably subdivided, in step 202, into first and second portions 301, 303 (see FIGS. 7–8), wherein the second portion 303 is used by the transceivers 114 for requesting access to the communication medium 113, and wherein the second portion 303 is further subdivided into a plurality of time slots, each time slot having a duration equal to or greater than a predetermined propagation delay of a signal transmitted between transceivers 114. The predetermined propagation delay is determined from a signal transmitted between a select two of the transceivers 114 that are farthest apart. The propagation delay may be measured according to the distance between the selected transceivers 114 divided by the speed of light.

For example, a signal transmitted between two transceivers 114 separated by a distance of 100 kilometers has a propagation delay of approximately 334 us (microseconds). This absolute time may be adjusted to, for example, 350 us to provide the transceivers 114 additional time for processing signals—this processing step will be discussed shortly. In the FLEX™ and ReFLEX™ protocols, a frame has a duration of 1.875 seconds. Since the duration of a time slot is extremely small in comparison to the interval of a frame, the overhead added by a time slot for requesting access to the communication medium 113 is small. This is an important benefit to the present invention, a point which becomes obvious during the discussions below.

Figure 3:
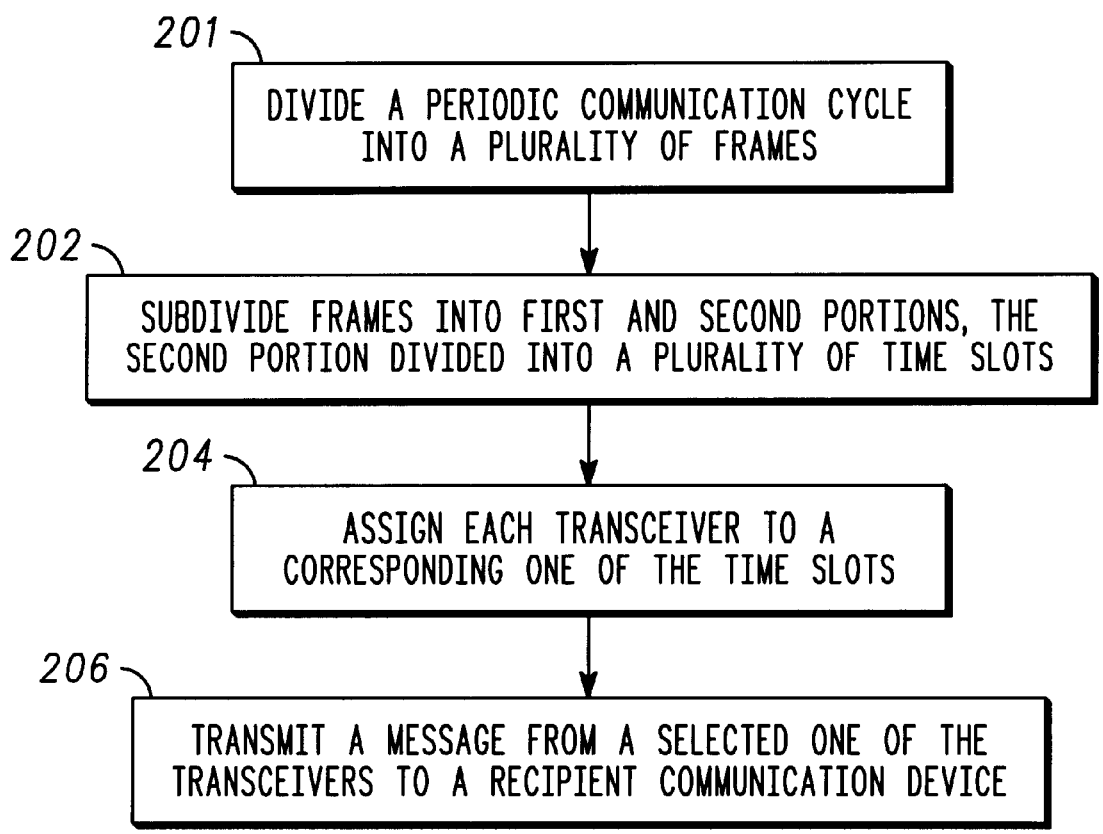
FIGS. 3–6 are flowcharts depicting how each of the embodiments of FIGS. 1–2 operate according to the present invention.
Figures 7, 8:
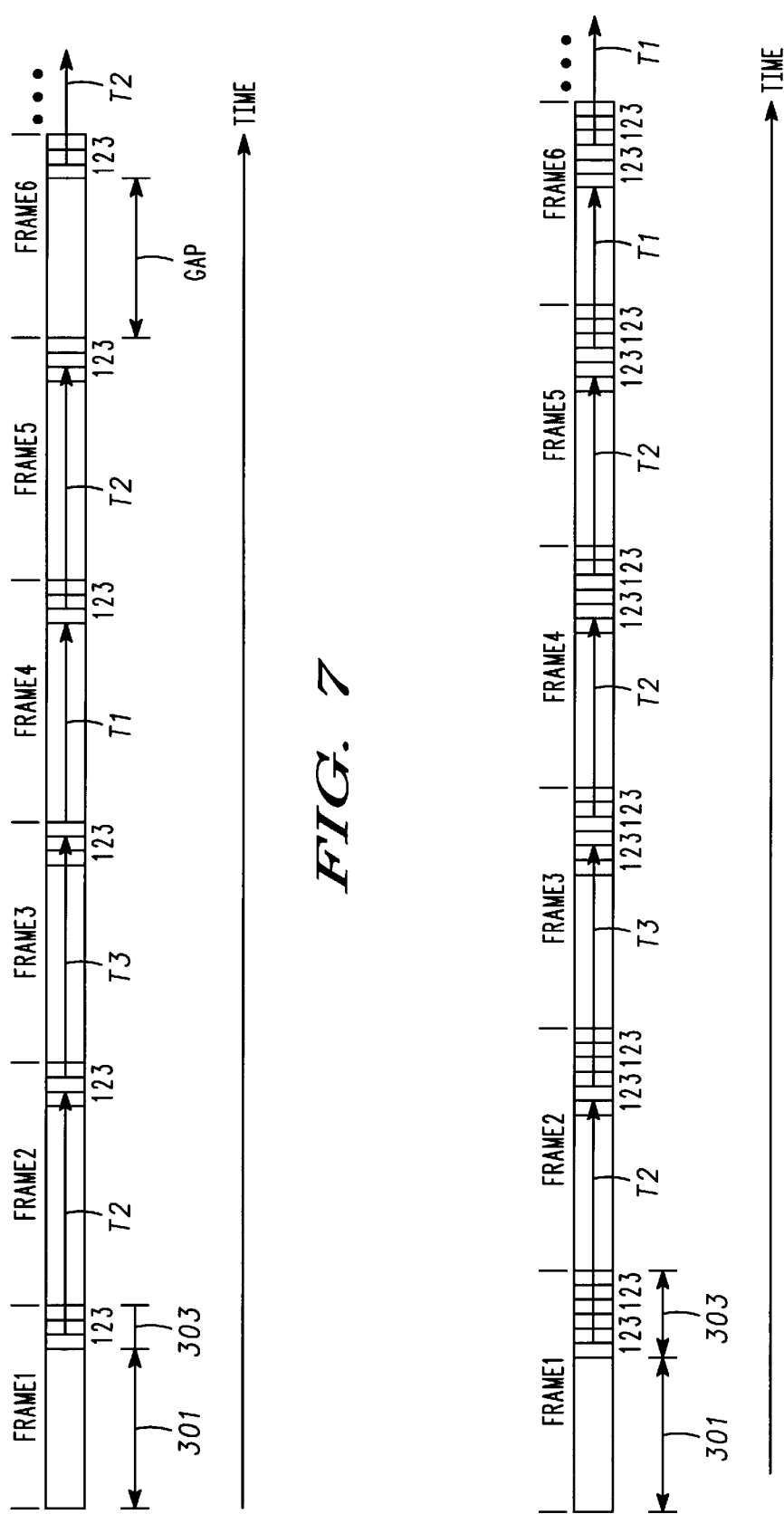
FIGS. 7–8 show timing diagrams illustrating the collision-free communication technique employed by the embodiments of FIGS. 1–2 according to the present invention.

Returning to the flowchart of FIG. 3, in step 204, each of the transceivers 114 are assigned to a corresponding one of the time slots. FIG. 7 shows by way of example frames (1–6), each frame having a second portion 303 with three time slots representative of an assignment of three transceivers 114 thereto. FIG. 8 shows the time slots in duplicate groups of three time slots. The difference between the embodiments of FIGS. 7 and 8 will discussed shortly. Under a three time slot arrangement, the second portion has a duration of 1.05 ms (milliseconds); that is, 0.056% of a FLEX™ or ReFLEX™ frame interval. Hence, the overhead in using time slots for arbitration of the communication medium 113 is small.

Figure 9:
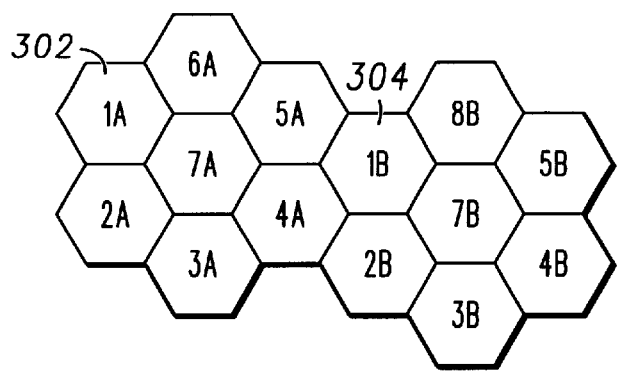
FIG. 9 shows a reuse pattern employed by the alternative embodiments of FIGS. 1–2 according to the present invention.

The cell clusters of FIG. 9 help to illustrate steps 202 and 204 in a wireless application for geographically fixed transceivers 114 according to the present invention. FIG. 9 shows two clusters of seven transceiver 114, each transceiver 114 covering a communication zone (hereinafter referred to as a cell). A first cluster 302 comprises seven transceiver 114 cells 1A–7A, and a second cluster 304 comprises seven transceiver 114 cells 1B–7B. According to the organization of transceivers 114 within these clusters, step 204 may be implemented by assigning each cluster to the same time slot arrangement.

For example, transceiver 114 of cell 1A may be assigned to time slot 1, transceiver 114 of cell 1B may be assigned to time slot 1, transceiver 114 of cell 2A may be assigned to time slot 2, transceiver 114 of cell 2B may be assigned to time slot 2, and so on. Since cells 1A and 1B are geographically far apart, simultaneous transmission from the transceivers 114 of these zones during the same time slot will not cause significant interference while utilizing the same channel. Thus, based on the arrangement of FIG. 9, time slot reuse (at a single transmission frequency) may be used to substantially expand the channel capacity of a communication system.

Step 202 discussed above may be implemented by, for example, selecting the transceivers 114 of zones 1A and 4A to pre-select a time slot duration. To avoid having varying time slot durations per cluster, the cluster having the farthest two transceivers 114 is preferably used for defining the duration of time slots for all clusters. In this manner, all transceivers 114 are guaranteed to have sufficient time to monitor traffic activities in the communication medium 113.

Figure 4:
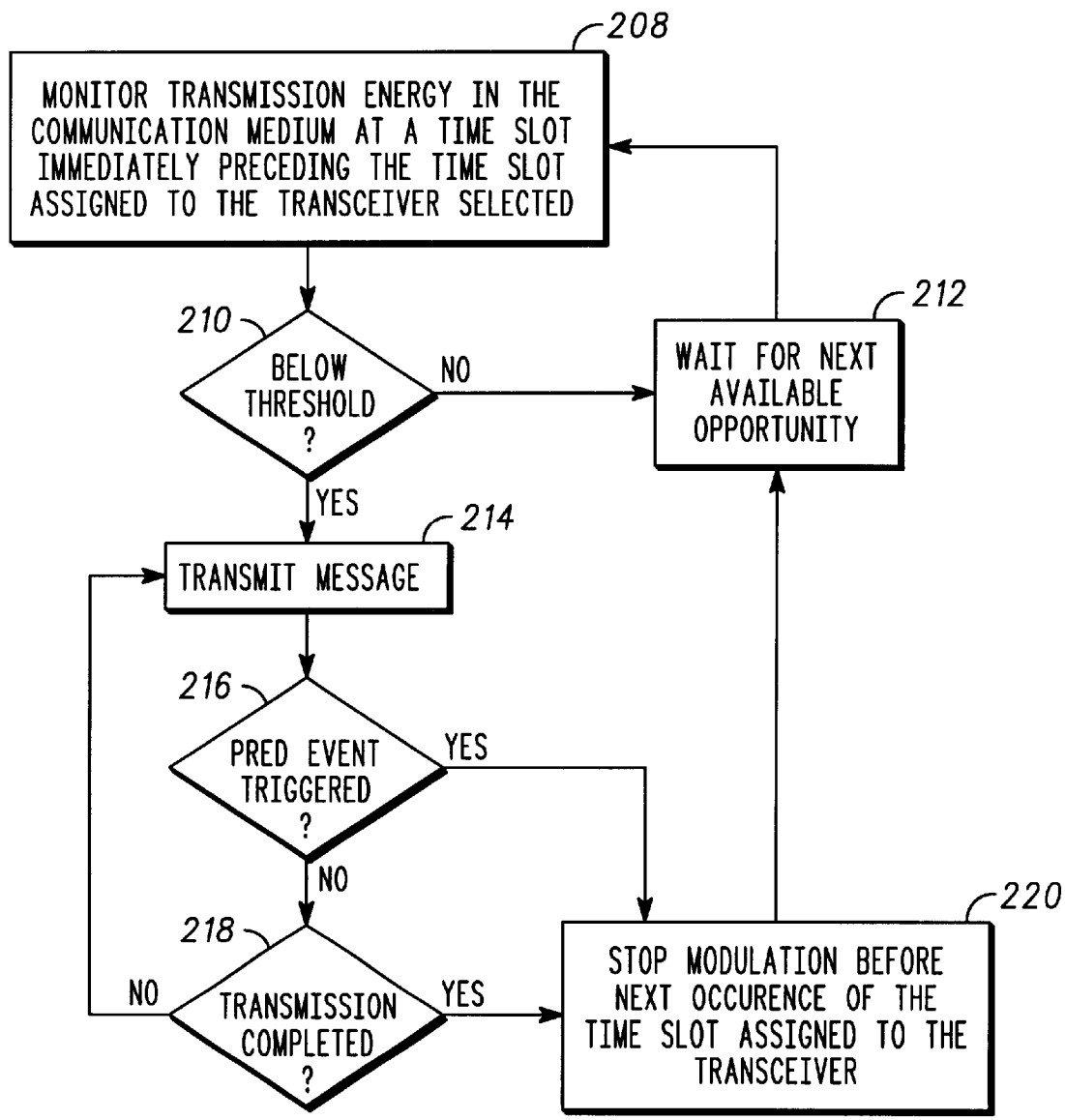
Figure 5:
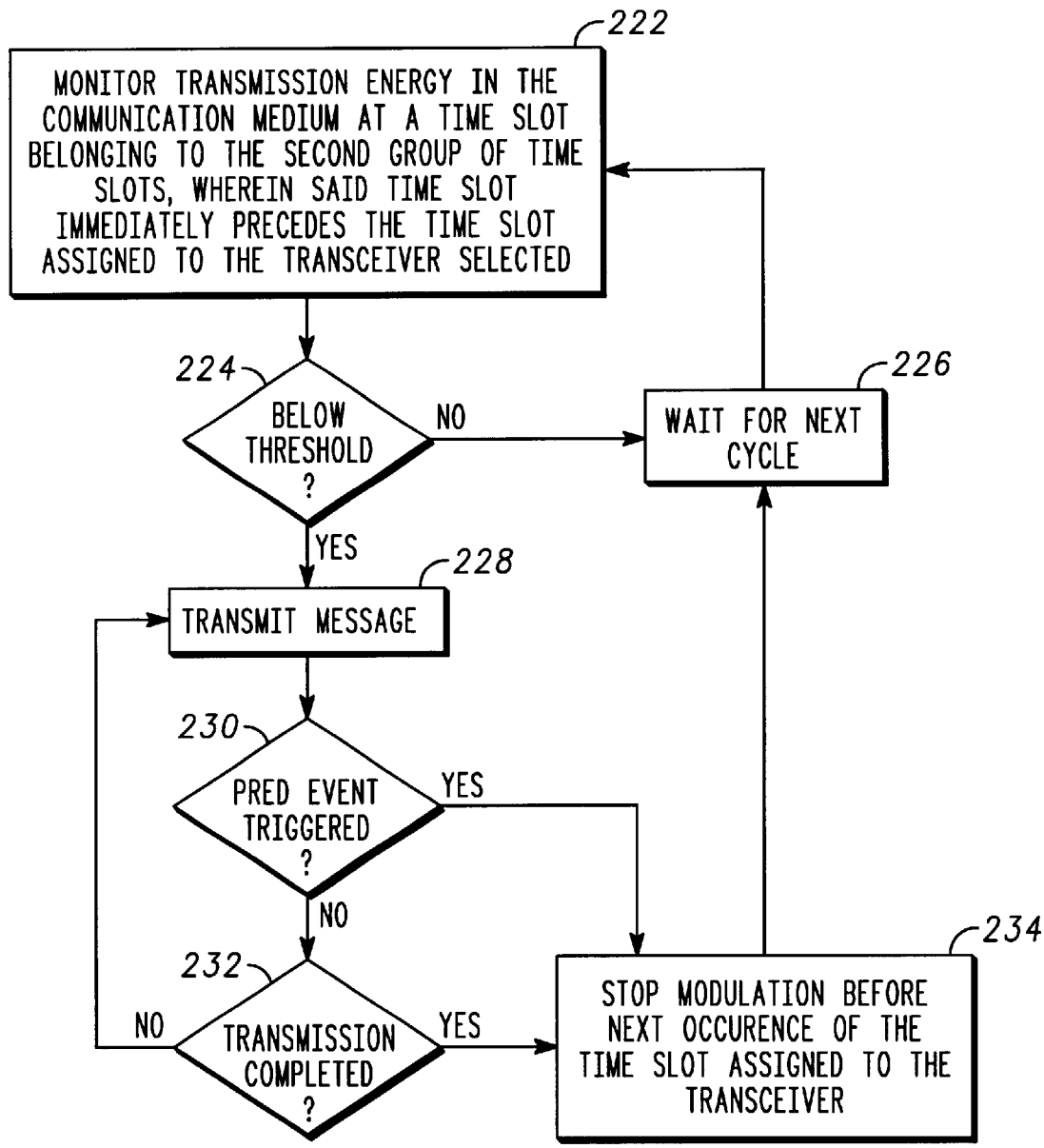

Turning now to step 206, a message is transmitted from a selected one of the transceivers 114 to the recipient communication device 115. This step is depicted in the flowchart of FIG. 4. This flowchart begins with step 208 where the selected transceiver 114 monitors transmission energy in the communication medium 113 at a time slot immediately preceding the time slot it was assigned. If at step 210 the energy measured is above a predetermined threshold (indicating traffic activity), the transceiver 114 selected proceeds to steps 212 and 208 where it waits for the next available opportunity to acquire the communication medium 113, and repeats the monitoring process. If, on the other hand, the energy measured in step 210 is below the predetermined threshold (indicating that the communication medium 113 is available), the transceiver 114 selected proceeds to step 214 where it transmits at least a portion of the message to the recipient communication device 115 beginning at the time slot it was assigned.

As just noted, the predetermined threshold identifies when the communication medium 113 is inactive. This threshold may be determined conventionally by experimentation or by measurements taken of the communication medium 113. For example, in a wireless communication medium the RF (Radio Frequency) characteristics of the communication medium 113 may be measured by conventional means (e.g., Receive Signal Strength Indication—RSSI level) for identifying a threshold that is representative of inactivity in the communication medium 113. The threshold selected must be such that each transceiver 114 can reasonably predict within its own cluster whether there is activity in the communication medium 113 during the time slot being monitored.

At step 216, the transceiver 114 determines whether a predetermined event has been triggered. In a first embodiment, the predetermined event is represented by a maximum length for transmitting messages. The maximum message length may be selected uniquely for each transceiver 114 or universally as one predetermined maximum message length for all transceivers 114. As an example, the predetermined maximum message length may be selected so that message transmission (that is subdivided into incremental packet lengths) terminates when the transceiver 114 selected transmits five hundred packets of message data.

Thus, at step 216, the transceiver 114 transmits less than the whole message when the length of the message exceeds a predetermined maximum message length. When this event occurs, the transceiver 114 proceeds from step 216 to step 220, where the transceiver 114 continues to transmit a modulated signal comprising in part a portion of the message, and terminates said modulation before the next occurrence of the time slot assigned to the transceiver 114 selected. The transceiver 114 then proceeds to step 212 where it waits to transmit the remainder of the message at the next available opportunity, which may be, for example, the next one or more frames.

If, on the other hand, the predetermined maximum message length has not been exceeded, the transceiver 114 proceeds from step 216 to step 218 where it determines whether transmission of the message has been completed. If it has not, then the transceiver 114 proceeds to step 214 where it continues to transmit the message. If the transmission of the message has been completed, then the transceiver 114 proceeds to steps 220, 212 and 208 as described above in preparation for transmitting subsequent messages.

Alternatively, step 216 may be triggered according to a predetermined interval. The predetermined interval may be selected uniquely for each transceiver 114 or universally as one predetermined interval for all transceivers 114. As an example, the predetermined interval may be selected so that transmission terminates when the transceiver 114 selected has been transmitting for more than two contiguous frames. Under this embodiment, the transceiver 114 transmits less than the whole message when the time necessary for transmitting the message exceeds the predetermined interval. When this event is detected in step 216, the transceiver 114 proceeds to steps 220, 212 and 208 as described above. If, on the other hand, the predetermined interval has not been exceeded, the transceiver 114 proceeds to step 218 as described earlier.

Steps 208–220 of FIG. 4 may be described by way of the illustrated embodiments of FIGS. 7–8. FIG. 7 shows six frames (1–6), each frame with three time slots (1–3) in the second portion 303, and each time slot assigned to one of three transceivers 114. The arrows shown represent the modulation of a signal which in part carries a portion of the message and in part no message data (e.g., a pilot signal). In a FLEX and ReFLEX communication system, the portion of the modulated signal that carries message information is preferably during the first portion 301 of a frame, and the portion carrying no message information preferably occurs during the second portion 303 of the frame.

To properly begin discussion of the illustrations of FIG. 7, assume that the first arrow in Frames 1 and 2 is representative of the second transceiver 114 (denoted by T2) beginning transmission of a modulated signal at time slot 2 of the second portion 303 of Frame 1, and terminating transmission before the beginning of time slot 2 in the second portion 303 of Frame 2.

Under this termination scenario, the transceiver 114 assigned to time slot 2 is blocked from acquiring the communication medium 113 during the second portion 303 of Frame 2. This is because the transceiver 114 assigned to time slot 2 monitors time slot 1 of the second portion 303 of Frame 2 and during the monitoring process detects transmission energy, thereby blocking said transceiver 114 from acquiring the communication medium 113. The transceivers 114 assigned to times slot 1 and 3, however, are able to acquire the communication medium 113 since time slots 2 and 3 of the second portion 303 of Frame 2 have no transmission energy.

In this example, the transceiver 114 assigned to time slot 3 (denoted by T3) acquires the communication medium 113 before the transceiver 114 assigned to time slot 1 has an opportunity. After acquiring the communication medium 113, the transceiver 114 assigned to time slot 3 proceeds to transmit a message in Frame 3 ending before time slot 3 of the second portion 303 of Frame 3. In this instance, time slots 1 and 2 of the second portion 303 of Frame 3 show activity, while time slot 3 is inactive. Accordingly, the transceivers 114 assigned to time slots 2 and 3 are blocked from acquiring the communication medium 113 as a result of there being transmission energy at time slots 1 and 2, which immediately precede the time slots assigned to these transceivers 114, respectively. However, the inactivity at time slot 3, provides the transceiver 114 assigned to time slot 1 an opportunity to acquire the communication medium 113.

It should be evident from these examples that when the transceiver selected is a transceiver 114 assigned to the first time slot (e.g., time slot 1 in FIG. 7), the step of transmitting a message from said transceiver 114 to the recipient communication device 115 comprises the steps of monitoring transmission energy in the communication medium 113 during the last time slot of the second portion 303 (time slot 3 in FIG. 7. And upon sensing that transmission energy is below the predetermined threshold, said transceiver 114 transmits at least a portion of the message to the recipient communication device 115 beginning after the last time slot (see FIG. 7 Frame 4). Additionally, it should be evident from the example of FIG. 7 that the transceiver 114 assigned to the first time slot ends transmission before the next occurrence of its own time slot (i.e., at the end of the first portion 301). This method of terminating transmission is consistent with the method described for the transceivers 114 assigned to time slots 2 and 3.

Termination of transmission prior to time slot 1 in Frame 4 makes the communication medium 113 available to all the transceivers 114 including the transceiver 114 assigned to time slot 1. However, the transceiver 114 assigned to time slot 1 must wait until after the transceivers 114 to time slots 2 and 3 have had an opportunity to acquire the communication medium 113.

In this example, the transceiver 114 assigned to time slot 2 acquires the communication medium 113, and releases it prior to the start of time slot 2 in the second portion 303 of Frame 5, thereby blocking itself from reacquiring the communication medium 113. Assuming that the transceiver 114 assigned to time slot 2 had more messages than it was able to transmit in Frame 5, and that the transceivers 114 assigned to time slots 1 and 3 had no need to acquire the communication medium 113 at the second portion 303 of Frame 5, then a gap of unused transmission time results as depicted in Frame 6, even though the transceiver 114 assigned to time slot 2 had messages to transmit. The transceiver 114 assigned to time slot 2, therefore, has to wait until Frame 7 to transmit additional messages.

This result occurs in part because of the underlying fairness algorithm used in the examples depicted in FIG. 7. In the example of FIG. 7 two rules are used for avoiding a biased priority of time slot assignments amongst the transceivers 114. A first rule requires that no transceiver 114 may transmit messages for an indefinite amount of time or message length. All transceivers 114 are preferably programmed to transmit messages for no more than a predetermined time (e.g., one frame at a time) or a maximum predetermined message length. Alternatively, each of the transceivers 114 may be programmed with differing time limits or maximum message lengths, which in itself, provides a means for assigning differing degrees of priority to each transceiver 114. This first rule is represented by step 216 of FIG. 4.

A second rule for providing equity amongst the transceivers 114 is to force the transceiver 114 that has acquired the communication medium 113 to terminate transmission at the time slot immediately preceding its own. This is shown in the examples depicted in FIG. 7. By applying the second rule to all transmissions, each of the downstream transceivers 114 is given an equal chance to acquire the communication medium 113. There may be instances under the second rule, however, where the fairness algorithm just described results in no transceivers 114 acquiring the communication medium 113 during a particular frame (as shown in Frame 6, FIG. 7).

To avoid this situation, the plurality of time slots is preferably bifurcated into duplicate first and second groups (as shown in FIG. 8). Under this organization of time slots, the transceivers 114 are assigned to a corresponding one of the time slots from each group. In the example shown in FIG. 8, one of the transceivers 114 is assigned to time slot 1 from the first and second groups, another to time slot 2 from the first and second groups, and so on.

Under this method of time slot assignments, a transceiver 114 monitors transmission energy in the communication medium 113 during a time slot belonging to the first group of time slots. As before, the time slot monitored immediately precedes the time slot assigned to the transceiver selected. If the energy sensed in the time slot is below the predetermined threshold, the transceiver selected transmits at least a portion of the message to the recipient communication device 115 during the first and second portions 301, 303 beginning at the time slot belonging to the first group of time slots assigned to the transceiver 114.

If, on the other hand, the energy sensed in said time slot is at or above the predetermined threshold, the transceiver 114 monitors transmission energy in the communication medium 113 during a time slot belonging to the second group of time slots. Again, the time slot monitored immediately precedes the time slot assigned to the transceiver selected. If the energy sensed in the time slot is below the predetermined threshold, the transceiver 114 transmits at least a portion of the message to the recipient communication device 115 during the first and second portions 301, 303 beginning at the time slot belonging to the second group of time slots assigned to the transceiver selected.

By duplicating the time slots, if there are no transceivers 114 acquiring the communication medium 113 during the first group of time slots, then those transceivers 114 who were previously blocked, now have an opportunity to gain access to the communication medium 113 during the second group of time slots. As a result of this arbitration method, there can no longer be unutilized frames (as shown in Frame 6, FIG. 7), unless none of the transceivers 114 need to acquire the communication medium 113.

FIG. 8 illustrates several examples of this method. In each of the frames shown there are six time slots divided into two groups, each of three time slots. In Frame 1 the transceiver 114 assigned to time slot 2 acquires the communication medium 113 and completes transmission before time slot 2 of the first group of time slots of Frame 2. As before, the transceiver 114 assigned to time slot 2 is blocked from acquiring the communication medium 113, while the transceivers 114 assigned to time slots 1 and 3 of the first group may request access to the communication medium 113. In this example, the transceiver 114 assigned to time slot 3 acquires the communication medium 113 by modulating a signal beginning at time slot 3 of the first group of Frame 2 and ending before time slot 3 of the first group of time slots of Frame 3.

In this instance, the transceivers 114 assigned to time slots 2 and 3 are blocked from acquiring the communication medium 113, while the transceiver 114 assigned to time slot 1 may acquire the communication medium 113 by modulating a signal after time slot 3 of the first group of time slots in Frame 3. Assume in this example, however, that the transceiver 114 assigned to time slot 1 has no need for acquiring the communication medium 113—hence, there are no takers in the first group of time slots. By way of the second group of time slots, the transceivers 113 assigned to time slots 2 and 3, which were previously blocked in the first group of time slots, now have an opportunity to acquire the communication medium 113. In this example, the communication medium 113 has been acquired by the transceiver 114 assigned to time slot 2, which modulates a signal at time slot 2 of the second group of time slots of Frame 3, and terminates before time slot 2 of the first group of time slots of Frame 4.

At this termination juncture, the transceivers 114 of time slots 1 and 3 may acquire the communication medium 113, while the transceiver 114 of time slot 2 is again blocked. Assume, however, that the transceiver 114 assigned to time slot 2 has a need to transmit more messages, and that the transceivers 114 assigned to time slots 1 and 3 do not. Under the embodiment of FIG. 7, an unutilized frame would result if the transceiver 114 assigned to time slot 2 has messages to transmit and the other transceivers 114 do not acquire the communication medium 113. However, as a result of the time slot assignment method of FIG. 8, the transceiver 113 assigned to time slot 2 may regain access to the communication medium 113 by arbitrating for it during the second group of time slots in Frame 4. Accordingly, the frame gap event shown in FIG. 7 is avoided.

Figure 6:
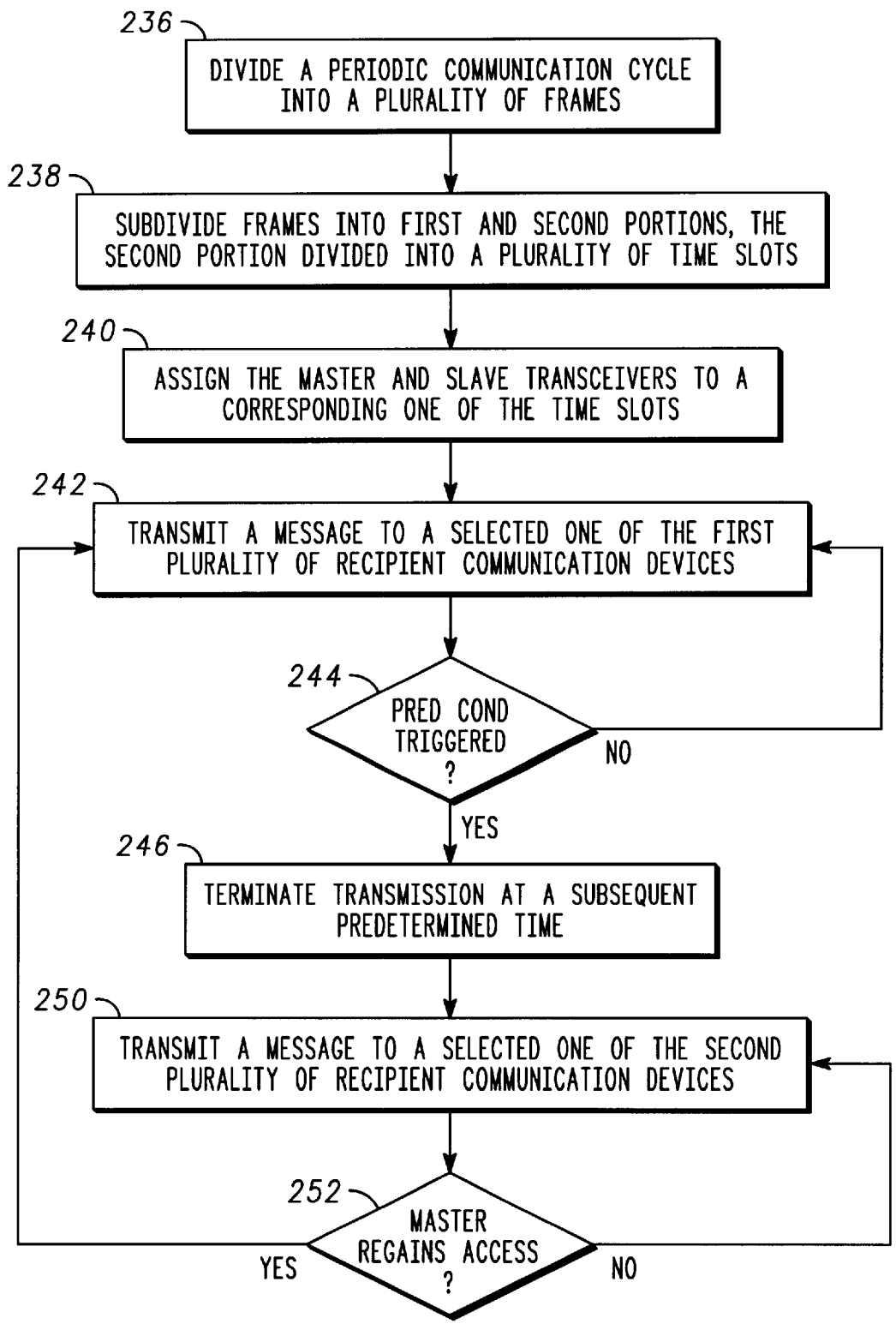

The flowchart of FIG. 6 shows yet another embodiment of the present invention. Particularly, FIG. 6 illustrates how the present invention may be used in a master-slave transceiver arrangement. Preferably, the master transceiver 114 controls access to the communication medium 113, while the slave transceivers 114 await for accessibility to the communication medium 113 by way of the master transceiver 114 releasing control of the communication medium 113. Preferably, the master and slave transceivers 114 utilize the communication medium 113 for transmitting messages to corresponding recipient communication devices 115. The recipient communication devices 113 may, for example, represent geographically fixed receivers or transceivers, or conventional portable battery-operated selective call receivers or transceivers. A master-slave transceiver arrangement is commonly used by private systems that share channel capacity with larger communication networks.

Similar to the flowchart of FIG. 3, a master transceiver 114 in step 236 divides a periodic communication cycle into a plurality of frames, each frame comprising a predetermined interval. The frames are in turn subdivided, in step 238, into first and second portions 301, 303 (see FIGS. 7 or 8), wherein the second portion 303 is used by the master and slave transceivers 114 for requesting access to the communication medium 113, and wherein the second portion 303 is further subdivided into a plurality of time slots, each time slot having a duration equal to or greater than a predetermined propagation delay of a signal transmitted between transceivers. In step 240, the master and slave transceivers 114 are assigned to a corresponding one of the time slots.

Steps 242–246, represents the operation of the master transceiver 114 while in control of the communication medium 113. In step 242, the master transceiver 114 transmits a message to a selected one of the first plurality of recipient communication devices 115 assigned to the master transceiver 114. Preferably, transmission begins from a selected one of the plurality of frames, and upon the occurrence of a predetermined condition in step 244, the master transceiver 114 proceeds to step 246 where it terminates message transmission at a subsequent predetermined time, thereby releasing control of the communication medium 113 to the slave transceivers 114.

Preferably, the predetermined condition occurs when a predetermined interval for transmitting messages has expired, or when the master transceiver 114 has no more messages to transmit. It will be appreciated, however, that other conditions for terminating transmission may be suitable for the present invention under this embodiment. The predetermined time for terminating transmission, preferably, occurs at or before the second portion 303 of a frame, or at the end of a selected one of the plurality of time slots. In latter case, a selected one of the plurality of time slots is chosen in order to block access to the most recent slave transceiver 114 that had access to the communication medium 113. This termination scheme allows the master transceiver 114 to provide fair access to all of the slave transceivers 114 by preventing upstream slave transceivers 114 from continuously gaining access to the communication medium 113 each time the master transceiver 114 releases access to the communication medium 113.

Continuing with the flowchart of FIG. 6, upon ceasing transmission, in step 246, a selected one of the slave transceivers 114, in step 250, may now gain access to the communication medium 113 for transmitting messages to a selected one of a second plurality of recipient communication devices 115 that exchange messages with the slave transceivers 114. Step 250 is implemented by way of the flowcharts of FIGS. 4 and 5 described above, and the time slot arrangement may take on either of the embodiments shown in FIGS. 7 or 8—for a discussion of these flowcharts and timing diagrams, the reader is directed to the above discussions. Upon the master transceiver 114 regaining access to the communication medium 113 in step 252, the master transceiver 114 proceeds to transmit messages as depicted in steps 242-246.

In a first embodiment, the master transceiver 113 regains access to the communication medium 113 according to the monitoring and acquisition schemes provided in FIGS. 4–5, and FIGS. 7–8, discussed above. That is, the master transceiver 114 regains access to the communication medium 113 in much the same way that the slave transceivers 114 arbitrate for access to the communication medium 113. In an alternative embodiment, several frames may be reserved (e.g., Frames 0, 8, 16, . . . ) for the master transceiver 114, thereby restricting the slave transceivers 114 from accessing the communication medium 113 during these frames. Accordingly, when the master transceiver 114 needs to regain access to the communication medium 113, it simply begins transmitting during any one of the reserved frames.

Figure 10:
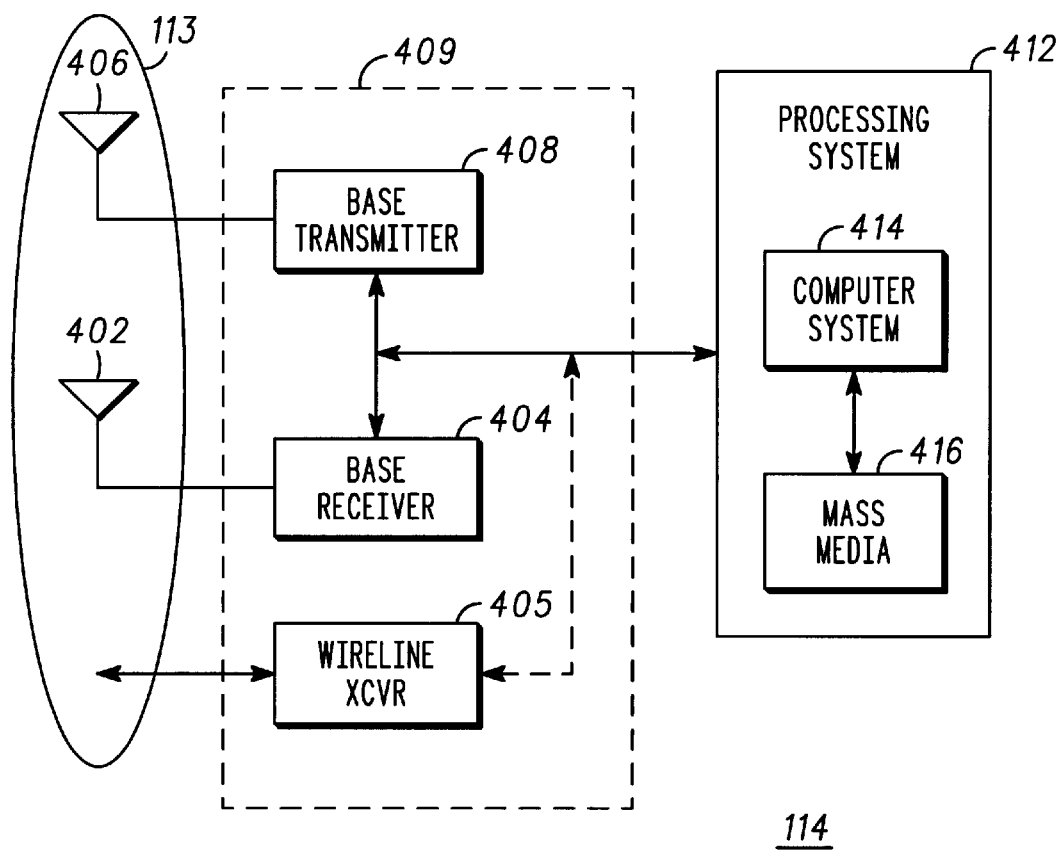
FIG. 10 shows an electrical block diagram of a wireline and wireless transceiver according to the present invention.

The hardware implementation of the transceivers 114 is shown in the electrical block diagram of FIG. 10. As shown, the transceiver 114 comprises a processing system 412, and a transceiver circuit 409. The processing system 412 is used for directing operation of the transceiver circuit 409. To accomplish this task, the processing system 412 includes a conventional computer system 414 and a conventional mass storage media 416. The computer system 414 is programmed by software stored in the mass storage media 416 that conforms to the operational steps described in FIGS. 3–6.

The transceiver circuit 409 is coupled to the processing system 412 for transmitting messages to the recipient communication device 115, which as described above, may take the form of a conventional SCR, or a one-way or two-way transceiver 114. Under wireless operations, the transceiver 114 comprises a conventional wireless base transmitter 408 and a conventional wireless base receiver 404 coupled to transmitter and receiver antennas 406, 402, respectively. Alternatively, under wireline operations, the transceiver circuit 409 comprises a conventional wireline transceiver 405.

It should be apparent by now that the present invention has substantial advantages over prior art decentralized communication protocols such as Ethernet and Aloha. Principally, the present invention provides a technique for dividing time into small incremental time slots which, according to the flowcharts above, allow for collision-free transmission of messages between communication devices coupled to a wireline or wireless communication medium. For high traffic communication systems, the present invention provides a collision-free environment that makes the best use of system channel capacity, along with providing the benefits of short message latency.

Although the invention has been described in terms of a preferred embodiment it will be obvious to those skilled in the art that many alterations and variations may be made without departing from the invention. Accordingly, it is intended that all such alterations and variations be considered as within the spirit and scope of the invention as defined by the appended claims.

What is claimed is:

1. In a plurality of transceivers coupled to a communication medium, a method for transmitting collision-free messages to a recipient communication device coupled to the communication medium, comprising the steps of:

dividing a periodic communication cycle into a plurality of frames, each frame comprising a predetermined interval;

subdividing each of the plurality of frames into first and second portions, wherein the second portion is used by the transceivers for requesting access to the communication medium, and wherein the second portion is further subdivided into a plurality of time slots, each time slot having a duration equal to or greater than a predetermined propagation delay of a signal transmitted between transceivers;

assigning each of the transceivers to a corresponding one or more of the time slots; and transmitting a message from a selected one of the transceivers to the recipient communication device, said transmitting step comprising the steps of:

monitoring transmission energy in the communication medium during a time slot immediately preceding the time slot assigned to the transceiver selected; and if the energy sensed is below a predetermined threshold, transmitting at least a portion of the message to the recipient communication device during the first and second portions beginning at the time slot assigned to the transceiver selected.

2. The method as recited in claim 1, wherein the plurality of transceivers comprise a plurality of wireline transceivers, the recipient communication device comprises a wireline communication device, and wherein the communication medium comprises a wireline communication medium.

3. The method as recited in claim 1, wherein the plurality of transceivers comprise a plurality of wireless transceivers, the recipient communication device comprises a wireless communication device, and wherein the communication medium comprises a wireless communication medium.

4. The method as recited in claim 1, wherein the transceiver selected has a predetermined interval for transmitting the message, and wherein said transceiver transmits less than the whole message when the time necessary for transmitting the message exceeds the predetermined interval, and said transceiver transmits the remainder of the message at the next available opportunity.

5. The method as recited in claim 1, wherein the transceiver selected transmits less than the whole message when the length of the message exceeds a predetermined message length, and wherein said transceiver transmits the remainder of the message at the next available opportunity.

6. The method as recited in claim 1, wherein the transceiver selected transmits a modulated signal, the modulated signal comprising in part a portion of the message, and wherein said modulation terminates before the next occurrence of the time slot assigned to the transceiver selected.

7. The method as recited in claim 1, wherein the predetermined propagation delay is determined from a signal transmitted between a selected two of the plurality of transceivers that are farthest apart.

8. The method as recited in claim 1, when the transceiver selected s a transceiver assigned to the first of the plurality of time slots, the step of transmitting a message from said transceiver to the recipient communication device comprises the steps of:

monitoring transmission energy in the communication medium during the last of the plurality of time slots following the time slot assigned to said transceiver; and if the energy sensed is below a predetermined threshold, transmitting at least a portion of the message to the recipient communication device beginning after the last time slot.

9. The method as recited in claim 8, wherein the transceiver selected has a predetermined interval for transmitting the message, and wherein said transceiver transmits less than the whole message when the time necessary for transmitting the message exceeds the predetermined interval, and said transceiver transmits the remainder of the message at the next available opportunity.

10. The method as recited in claim 8, wherein the transceiver selected transmits less than the whole message when the length of the message exceeds a predetermined message length, and wherein said transceiver transmits the remainder of the message at the next available opportunity.

11. The method as recited in claim 8, wherein said transceiver transmits a modulated signal, the modulated signal comprising in part a portion of the message, and wherein said modulation terminates before the next occurrence of the time slot assigned to said transceiver.

12. The method as recited in claim 1, wherein the assignment step comprises the steps of:
bifurcating the plurality of time slots into duplicate first and second groups; and
assigning each of the transceivers to a corresponding one of the time slots from each group.

13. The method as recited in claim 12, wherein the transmitting step comprises the steps of:
monitoring transmission energy in the communication medium during a time slot belonging to the first group of time slots, wherein said time slot immediately precedes the time slot assigned to the transceiver selected;
if the energy sensed in said time slot is below a predetermined threshold, transmitting at least a portion of the message to the recipient communication device during the first and second portions beginning at the time slot belonging to the first group of time slots assigned to the transceiver selected;
if the energy sensed in said time slot is at or above the predetermined threshold, monitoring transmission energy in the communication medium during a time slot belonging to the second group of time slots, wherein said time slot immediately precedes the time slot assigned to the transceiver selected; and
if the energy sensed in said time slot is below the predetermined threshold, transmitting at least a portion of the message to the recipient communication device during the first and second portions beginning at the time slot belonging to the second group of time slots assigned to the transceiver selected.

14. The method as recited in claim 1, wherein the transmitting step the recipient communication device comprises a portable selective call radio.

15. In a plurality of transceivers coupled to a communication medium, wherein the plurality of transceivers comprise a master transceiver for transmitting messages to any one of a first plurality of recipient communication devices, and a plurality of slave transceivers for transmitting messages to any one of a corresponding second plurality of recipient communication devices, a method for transmitting collision-free messages from the master and slave transceivers to the first and second recipient communication devices, comprising the steps of:
dividing a periodic communication cycle into a plurality of frames, each frame comprising a predetermined interval;
subdividing each of the plurality of frames into first and second portions, wherein the second portion is used by the transceivers for requesting access to the communication medium, and wherein the second portion is further subdivided into a plurality of time slots, each time slot having a duration equal to or greater than a predetermined propagation delay of a signal transmitted between transceivers;
assigning each of the slave transceivers to a corresponding one or more of the time slots;
at the master transceiver,
transmitting a message to a selected one of the first plurality of recipient communication devices, transmission beginning from a selected one of the plurality of frames;
upon the occurrence of a predetermined condition, terminating message transmission at a subsequent predetermined time; and
at a selected one of the slave transceivers, transmitting a message to a selected one of the second plurality of recipient communication devices, said transmitting step comprising the steps of:
monitoring transmission energy in the communication medium during a time slot immediately preceding the time slot assigned to the slave transceiver selected; and
if the energy sensed is below a predetermined threshold, transmitting at least a portion of the message to the selected recipient communication device beginning at the time slot assigned to the transceiver selected.

16. The method as recited in claim 15, wherein the selected recipient communication device comprises a portable selective call radio.

17. The method as recited in claim 15, wherein the predetermined condition is triggered when a predetermined interval for transmitting messages has expired.

18. The method as recited in claim 15, wherein the predetermined condition is triggered when the master transceiver has no more messages to transmit.

19. The method as recited in claim 15, wherein the subsequent predetermined time occurs at or before the second portion of a frame.

20. The method as recited in claim 15, wherein the subsequent predetermined time occurs at the end of a selected one of the plurality of time slots.

21. The method as recited in claim 20, wherein the selected one of the plurality of time slots is chosen in order to block access to the most recent slave transceiver that had access to the communication medium.

22. The method as recited in claim 15, wherein the assignment step comprises the steps of:
bifurcating the plurality of time slots into duplicate first and second groups; and
assigning each of the slave transceivers to a corresponding one of the time slots from each of the first and second group of time slots.

23. The method as recited in claim 22, wherein the transmitting step comprises the steps of:
monitoring transmission energy in the communication medium during a time slot belonging to the first group of time slots, wherein said time slot immediately precedes the time slot assigned to the transceiver selected;
if the energy sensed in said time slot is below a predetermined threshold, transmitting at least a portion of the message to the selected recipient communication device during the first and second portions beginning at the time slot belonging to the first group of time slots assigned to the transceiver selected;

if the energy sensed in said time slot is at or above the predetermined threshold, monitoring transmission energy in the communication medium during a time slot belonging to the second group of time slots, wherein said time slot immediately precedes the time slot assigned to the transceiver selected; and if the energy sensed in said time slot is below the predetermined threshold, transmitting at least a portion of the message to the selected recipient communication device during the first and second portions beginning at the time slot belonging to the second group of time slots assigned to the transceiver selected.

24. The method as recited in claim 15, wherein the assignment step comprises the steps of:

assigning the master transceiver to one of the plurality of time slots;

upon the master transceiver needing to regain access to the communication medium in order to transmit a message to a selected one of the first plurality of recipient communication devices, monitoring transmission energy in the communication medium during a time slot immediately preceding the time slot assigned to the master transceiver; and if the energy sensed is below a predetermined threshold, transmitting at least a portion of the message to the selected recipient communication device beginning at the time slot assigned to the master transceiver.

25. The method as recited in claim 15, further comprising the step of restricting the plurality of slave transceivers from gaining access to the communication medium at one or more of the plurality of frames, wherein the master transceiver regains access to the communication medium by transmitting a message during any one of the one or more reserved frames.

26. A plurality of transceivers, each comprising:

a transceiver circuit; and a processing system coupled to the transceiver circuit, wherein a periodic communication cycle is divided into a plurality of frames, each frame comprising a predetermined interval;

wherein each of the plurality of frames is subdivided into first and second portions, wherein the second portion is used by the transceivers for requesting access to a communication medium, and wherein the second portion is further subdivided into a plurality of time slots, each time slot having a duration equal to or greater than a predetermined propagation delay of a signal transmitted between transceivers;

wherein each of the transceivers is assigned to a corresponding one or more of the time slots; and wherein to transmit a message from a selected one of the transceivers to a recipient communication device, the processing system of the transceiver selected is adapted to:

enable the transceiver circuit to monitor transmission energy in the communication medium during a time slot immediately preceding the time slot assigned to the transceiver selected; and if the energy measured is below a predetermined threshold, cause the transceiver circuit to transmit at least a portion of the message to the recipient communication device beginning at the time slot assigned to the transceiver selected.

27. A plurality of transceivers comprising a master transceiver and slave transceivers, each plurality of transceivers for transmitting messages to a corresponding first and second plurality of recipient communication devices, respectively, and each of the plurality of transceivers comprising:

a transceiver circuit; and a processing system coupled to the transceiver circuit, wherein a periodic communication cycle is divided into a plurality of frames, each frame comprising a predetermined interval;

wherein each of the plurality of frames is subdivided into first and second portions, wherein the second portion is used by the transceivers for requesting access to a communication medium, and wherein the second portion is further subdivided into a plurality of time slots, each time slot having a duration equal to or greater than a predetermined propagation delay of a signal transmitted between transceivers;

wherein each of the transceivers is assigned to a corresponding one or more of the time slots; and wherein for the master transceiver, the processing system thereof is adapted to:

cause the transceiver circuit to transmit a message to a selected one of the first plurality of recipient communication devices, transmission beginning from a selected one of the plurality of frames;

upon the occurrence of a predetermined condition, cause the transceiver circuit to terminate message transmission at a subsequent predetermined time; and wherein at a selected one of the slave transceivers, the processing system thereof is adapted to:

cause the transceiver circuit to transmit a message to a selected one of the second plurality of recipient communication devices, said transmitting step comprising the steps of:

enable the transceiver circuit to monitor transmission energy in the communication medium during a time slot immediately preceding the time slot assigned to the slave transceiver selected; and if the energy sensed is below a predetermined threshold, cause the transceiver circuit to transmit at least a portion of the message to the selected recipient communication device beginning at the time slot assigned to the transceiver selected.

* * * * *